Aug. 12, 1930.  C. B. JAHNKE  1,772,461

LUBRICATION MEANS

Filed Jan. 3, 1927

INVENTOR
*CHARLES B. JAHNKE*
BY *Roy M. Eilers*
ATTORNEY

Patented Aug. 12, 1930

1,772,461

UNITED STATES PATENT OFFICE

CHARLES B. JAHNKE, OF BELOIT, WISCONSIN, ASSIGNOR TO FAIRBANKS, MORSE & CO., OF CHICAGO, ILLINOIS, A CORPORATION OF ILLINOIS

LUBRICATION MEANS

Application filed January 3, 1927. Serial No. 158,602.

My invention relates to improvements in lubrication means and comprises means for lubricating bearings located in reciprocating parts of mechanisms, such as the piston pin bearing in internal combustion engines for example.

The object of my invention is to provide lubricating means of the type described which are simple and positive in operation, economical to construct and which provide for the ample lubrication of the parts described without necessitating constant attention.

Further objects and advantages of my invention will appear from the following drawings and description thereof.

Although my invention consists largely in the construction and arrangement of parts hereinafter described, yet I do not limit my invention to the precise form or construction of parts shown or the several parts thereof, inasmuch as various alterations may be made without changing the scope of my invention as pointed out in the appended claims.

Figure 1:
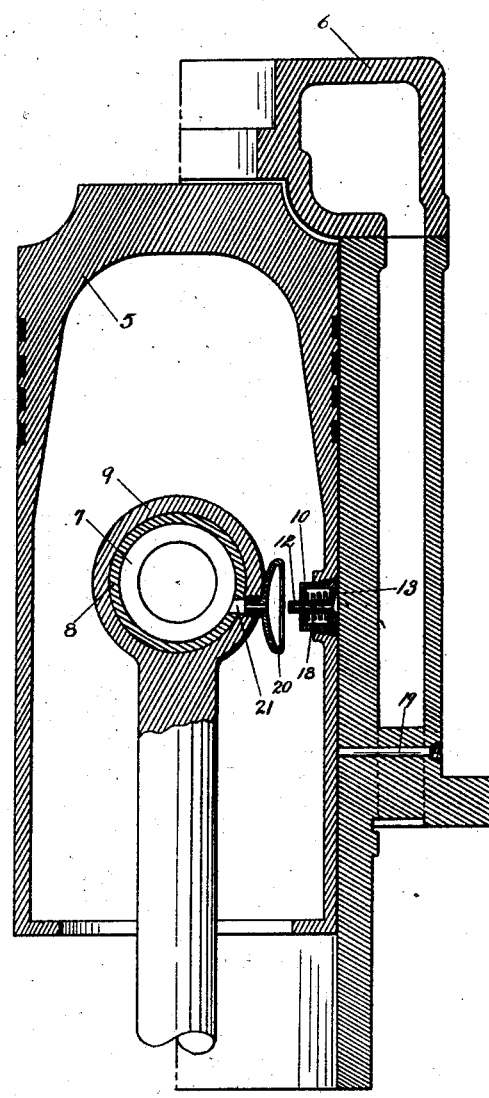
Figure 2:
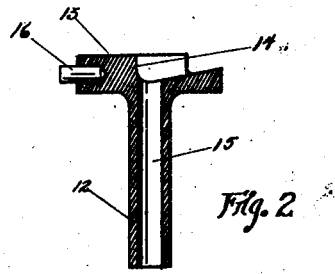
Figure 3:
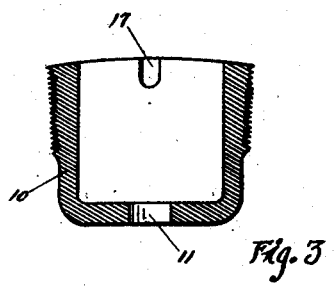
Figure 4:
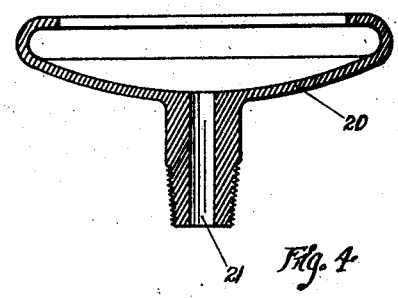

In the drawings, wherein the same reference characters are used to designate the same elements wherever they may appear in each of the several views, Fig. 1 is a cross-section of part of a horizontal internal combustion engine (drawn vertically for convenience in representation) to which an approved form of my invention has been applied; Fig. 2 is an enlarged sectional view of a preferred form of my oil scraper; Fig. 3 is an enlarged cross-section of an approved form of the holder used to retain the oil scraper shown in Fig. 1; and Fig. 4 is a sectional view of an approved form of my oil catcher.

Referring by numerals to the drawings, 5 denotes the piston and 6 the cylinder casting of an internal combustion engine which may be of any type and applied to which I show an approved form of my invention.

A piston pin is shown at 7 preferably provided with a bushing 8 carried by connecting rod 9. A preferred form of scraper-holder is shown at 10 and comprises a cup-shaped member preferably threaded into the skirt of the piston 5 at a suitable position above the piston pin 7. Holder 10 is preferably provided with an opening 11 through which the stem 12 of an approved form of my scraper projects. The scraper is preferably provided with a head portion 13, having a hollowed-out portion forming a scraping edge 14 and leading into oil duct 15 drilled through stem 12. A pin 16 in head 13 operating in slot 17 in holder 10 prevents the scraper from turning, and a spring 18 preferably located in holder 10 forces the scraper outwardly and in operative contact with the walls of the cylinder. The general contour of the top of the scraper is preferably the same as that of the piston wall. Oil may be fed to the cylinder wall in any suitable manner as through duct 19 from any suitable type of lubricator, not shown. As a means for catching the oil drip from stem 12, I provide an oil catcher 20 attached in any suitable manner to connecting rod 9 and above piston pin 7. This catcher preferably comprises a cup-shaped member 20 having a duct 21 for the purpose of carrying the oil to the pin.

In operation it will be seen that as the piston reciprocates in the cylinder the scraper will remove a certain amount of oil from the cylinder walls and this oil, depending upon its quantity and pressure, will be forced or projected through stem 12 into catcher 20 from which it will pass through duct 21 to lubricate the pin 7. In the executional example shown, the scraper is so arranged as to scrape oil as the piston approaches the head-end. It is evident, however, that the scraper may be reversed so as to scrape oil when the piston approaches the crank end, or I may provide my device with two scraping edges so that it will scrape oil while moving in either direction.

While the lubricating means described above is illustrated as applied to a horizontal engine (shown vertically in the drawing for convenience) it is evident that it may be applied equally well to vertical engines by disposing the scraper unit in the piston skirt at a point vertically above the catcher element, suitably shaping the mouth of the catcher 20 and inclining the duct 21 so as to direct the oil caught by member 20 to the bearing. It is obvious that the device is also applicable to any type of reciprocating mechanism, e. g., slide valves, cross-heads, and the like, where it is possible to dispose the scraper and catcher units in the coacting relation described herein, and where it may be desirable to avoid physical connection between the scraping and receiving elements of the device.

I claim:

1. In a lubricating device adapted to secure its supply of lubricant from a lubricated surface and to transmit said lubricant to other points to be lubricated, the combination of scraper means adapted to remove lubricant from said surface, said means comprising a member provided with scraping surfaces and a conduit for conveying the scraped-off lubricant, resilient means for holding said scraper member against said lubricated surface and receiving means in operative relation to said scraper means and adapted to direct the lubricant to its place of consumption, said receiving means comprising a cup-shaped member disposed adjacent said scraper member and being adapted to receive lubricant from said scraper member and to direct said lubricant to its place of consumption.

2. In a lubricating device adapted to secure its supply of lubricant from a lubricated surface and to transmit said lubricant to other points to be lubricated, the combination of scraper means adapted to remove lubricant from said surface, said means comprising a member provided with scraping surfaces and a conduit for conveying the scraped-off lubricant, resilient means for holding said scraper member against said lubricated surface and receiving means in operative relation to said scraper means and adapted to direct the lubricant to its place of consumption, said receiving means comprising a member having a cup-shaped lubricant receiving portion and a conduit connected thereto for conveying the lubricant to its place of consumption.

3. In a lubricating device adapted to secure its supply of lubricant from a lubricated surface and to transmit said lubricant to other points to be lubricated, the combination of scraper means adapted to remove lubricant from said surface, said means comprising a scraper member having a conduit therein, guide means for preventing rotation of said member, resilient means for holding said scraper against said lubricated surface, and receiving means in operative relation to said scraper means and adapted to direct the lubricant to its place of consumption, said receiving means comprising a member having a cup-shaped lubricant receiving portion and a conduit connected thereto for conveying the lubricant to its place of consumption.

4. In a wrist pin lubricating device adapted to be carried by a reciprocating mechanism and to secure its supply of lubricant from a lubricated surface, a wrist pin, a bearing therefor, means for supplying said bearing with lubricant, said means comprising a scraper member adapted to remove lubricant from the surface over which it slides, a conduit associated with said means for conveying and directing the removed lubricant, means associated with said wrist pin bearing and adapted to receive and convey said lubricant to said wrist pin, said means comprising a cup-shaped member adapted to receive the lubricant transmitted to it by said scraper means and conduit means associated with said cup-shaped member to convey said lubricant to said wrist pin.

CHARLES B. JAHNKE.